United States Patent
Vajravel et al.

(10) Patent No.: US 12,248,592 B2
(45) Date of Patent: Mar. 11, 2025

(54) ENABLING PERSISTENCE IN A VOLATILE SECURE WORKSPACE

(71) Applicant: Dell Products L.P., Round Rock, TX (US)

(72) Inventors: Gokul Thiruchengode Vajravel, Bangalore (IN); Ramanujam Kaniyar Venkatesh, Bangalore (IN); Ramanaa H V, Bangalore (IN); Jyothi Bandakka, Bengaluru (IN); Curtis J. Schwebke, Los Gatos, CA (US)

(73) Assignee: Dell Products L.P., Round Rock, TX (US)

( * ) Notice: Subject to any disclaimer, the term of this patent is extended or adjusted under 35 U.S.C. 154(b) by 232 days.

(21) Appl. No.: 18/052,286

(22) Filed: Nov. 3, 2022

(65) Prior Publication Data

US 2024/0152639 A1 May 9, 2024

(51) Int. Cl.
*G06F 21/62* (2013.01)

(52) U.S. Cl.
CPC .................. *G06F 21/6218* (2013.01)

(58) Field of Classification Search
CPC .............. G06F 9/45533; G06F 9/4555; G06F 9/45558; G06F 2009/45562–45566; G06F 2009/45579; G06F 2009/45587; G06F 21/53; G06F 21/62; G06F 21/6218–6281

See application file for complete search history.

(56) References Cited

U.S. PATENT DOCUMENTS

| | | | |
|---|---|---|---|
| 2015/0089172 A1* | 3/2015 | Kulkarni | G06F 9/45558 711/162 |
| 2018/0088973 A1* | 3/2018 | Subhraveti | G06F 8/60 |

* cited by examiner

*Primary Examiner* — Kevin Bechtel
(74) *Attorney, Agent, or Firm* — Kirton McConkie; Brian Tucker

(57) ABSTRACT

Persistence can be enabled in a volatile secure workspace. A management service may be configured to provide a managed application image containing a managed application to a host agent on a user computing device. When a secure workspace is deployed on the user computing device, the host agent can attach the managed application image to the secure workspace to create an injected volume. The host agent can also provide image details of the managed application image to a file system filter in the secure workspace. The file system filter may cause the managed application to be loaded from the managed application image and may then redirect I/O performed by the managed application to the injected volume which in turn will cause such I/O to be persisted in the managed application image. In this way, the managed application, any files it creates or modifies, and any state will be persisted even though the secure workspace is volatile.

17 Claims, 8 Drawing Sheets

ENABLING PERSISTENCE IN A VOLATILE SECURE WORKSPACE

CROSS-REFERENCE TO RELATED APPLICATIONS

N/A

BACKGROUND

In the context of this application, a secure workspace refers to an isolated environment in which one or more applications may be hosted on a computing device. A secure workspace, which may also be referred to as a sandbox, is oftentimes implemented using a virtual machine or a software-based container. An application hosted in a secure workspace will be isolated from resources in the external environment and from other applications or services hosted external to the secure workspace.

Secure workspaces in the form of virtual machines may oftentimes be volatile to provide enhanced security. For example, Windows Sandbox is a virtual machine-based secure workspace solution where the secure workspaces are volatile. In other words, when the secure workspace is closed, an application hosted in the secure workspace, its files and corresponding state are deleted. As a result, when the user again loads the application that is deployed in the secure workspace, it will be loaded in a new/clean instance of the secure workspace.

This volatileness of virtual machine-based secure workspaces creates various difficulties. For example, if an application, such as AutoCAD, is hosted in a secure workspace on a user computing device and the user logs off, shuts down the user computing device, or otherwise closes the secure workspace after completing 90% of a project, the application, the project, and any customizations or other user-specific state that existed before the logoff or shutdown will be deleted. If the user is not aware that this will be the result of a logoff or shutdown, it can be devastating. Even if the user is aware and takes some action to allow the project to be recovered from an external source, the application will still need to be installed in a new instance of the secure workspace. Even though an administrator can use scripts to automate the reinstallation once the new instance of the secure workspace is deployed, the installation of the application can oftentimes take a long time (e.g., up to 20 minutes). Accordingly, although the volatileness of these secure workspaces provides security benefits, these benefits are offset by loss of work and delays.

BRIEF SUMMARY

The present invention extends to systems, methods and computer program products for enabling persistence in a volatile secure workspace. A management service may be configured to provide a managed application image containing a managed application to a host agent on a user computing device. When a secure workspace is deployed on the user computing device, the host agent can attach the managed application image to the secure workspace to create an injected volume. The host agent can also provide image details of the managed application image to a file system filter in the secure workspace. The file system filter may cause the managed application to be loaded from the managed application image and may then redirect I/O performed by the managed application to the injected volume which in turn will cause such I/O to be persisted in the managed application image. In this way, the managed application, any files it creates or modifies, and any state will be persisted even though the secure workspace is volatile.

In some embodiments, the present invention may be implemented as a method for enabling persistence in a volatile secure workspace. A managed application image that is associated with a secure workspace can be obtained on a user computing device. The managed application image may include a managed application. In response to the secure workspace being deployed on the user computing device, the managed application image can be mounted to the secure workspace to create an injected volume within the secure workspace. The managed application can be loaded in the secure workspace from the managed application image. I/O requests associated with the managed application can be redirected to the managed application image to thereby create or update one or more artifacts on the managed application image. The managed application image with the one or more artifacts can be persisted when the secure workspace is stopped.

In some embodiments, the present invention may be implemented as computer storage media storing computer executable instructions which when executed implement a method for enabling persistence in a volatile secure workspace. A managed application image that is associated with a secure workspace can be obtained on a user computing device. In response to the secure workspace being deployed on the user computing device, the managed application image can be mounted to the secure workspace to create an injected volume within the secure workspace. Image details for the managed application image can be provided to a file system filter running in the secure workspace. The image details may identify a managed application contained in the managed application image. The file system filter can receive a request to start the managed application. The image details can be used to cause the managed application to be loaded in the secure workspace from the managed application image.

In some embodiments, the present invention may be implemented as a system that includes a management server having a management service and at least one user computing device that includes a host agent. The host agent may be configured to obtain a managed application image from the management service and to attach the managed application image to a secure workspace that includes a file system filter. The file system filter may be configured to cause a managed application stored on the managed application image to be loaded in the secure workspace and to redirect I/O requests associated with the managed application to the managed application image.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
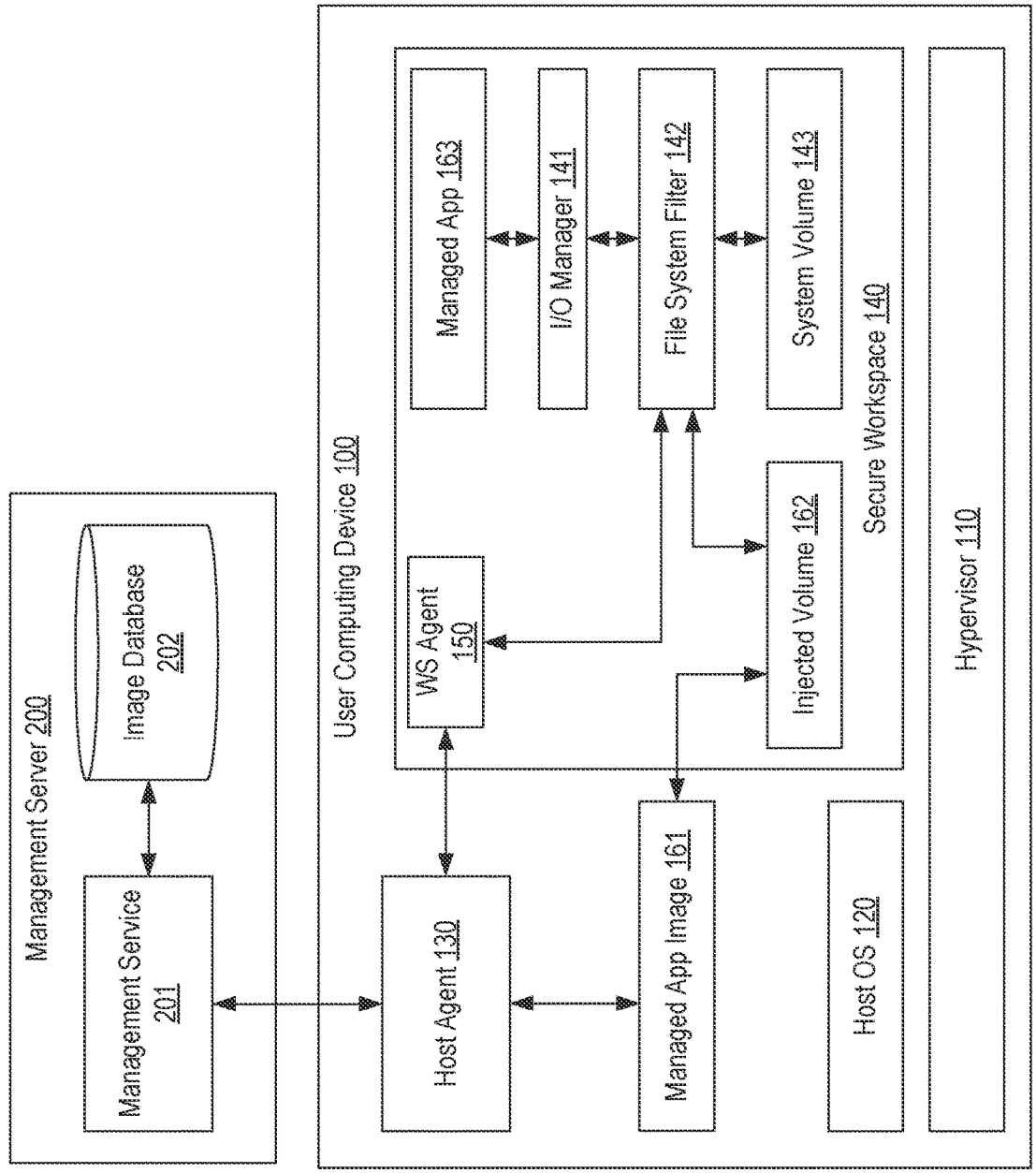
FIG. 1 provides an example of a computing environment in which embodiments of the present invention may be implemented.

FIG. 1 provides an example of a computing environment in which embodiments of the present invention may be implemented. This computing environment includes a user computing device 100 and a management server 200 from which user computing device 100 may be managed. User computing device 100 can represent any computing device on which a virtual machine-based secure workspace may be deployed such as a desktop, a laptop, a tablet, a thin client, etc. Although a single user computing device 100 is shown, there may be many user computing devices that are configured in the same or similar manner to enable persistence in a volatile secure workspace.

User computing device 100 may include a hypervisor 110 and a host operating system (OS) 120. Hypervisor 110 may allow one or more virtual machine-based secure workspaces, such as secure workspace 140, to be deployed on user computing device 100. User computing device 100 also includes a host agent 130 which can interface with a management service 201 on a management server 200 as part of enabling persistence in secure workspace 140 in accordance with embodiments of the present invention. Management server 200 can represent any hardware configuration for hosting management service 201 such as a standalone server computing device, a virtual machine, a cloud infrastructure, etc. Management service 201 may maintain or otherwise have access to an image database 202 in which images for volatile secure workspaces may be stored.

Secure workspace 140 can include an operating system that provides an I/O manager 141 that enables components executing in secure workspace 140 to access a system volume 143 (e.g., the C: volume). In accordance with embodiments of the present invention, a file system filter 142 may be installed above system volume 143 in the I/O stack. Also, a workspace agent 150 may be included in secure workspace 140 and may be configured to interface with host agent 130. In some embodiments, an image from which secure workspace 140 is deployed can include the operating system, I/O manager 141, and file system filter 142. Accordingly, each time secure workspace is deployed, only these components will remain (e.g., the contents of system volume 143 are not persisted).

As an overview, to enable persistence in secure workspace 140, management service 201 may be configured to provide a managed application image 161 containing a managed application 163 to host agent 130. When secure workspace 140 is deployed, host agent 130 can attach managed application image 161 to secure workspace 140 to create injected volume 162. Host agent 130 can also inform workspace agent 150 of the image details of managed application image 161 such as the presence of managed application 163 on managed application image 161 and details for injected volume 162. Workspace agent 150 can then provide these image details to file system filter 142. File system filter 142 may then merge injected volume 162 with system volume 143 thereby causing the content of injected volume 162, including managed application 163, to be visible and accessible via I/O manager 141. File system filter 142 can then redirect I/O performed by managed application 163 to injected volume 162 which in turn will cause such I/O to be persisted in managed application image 161. In this way, managed application 163, any files it creates or modifies, and any state will be persisted even though secure workspace 140 is volatile.

Figure 2A:
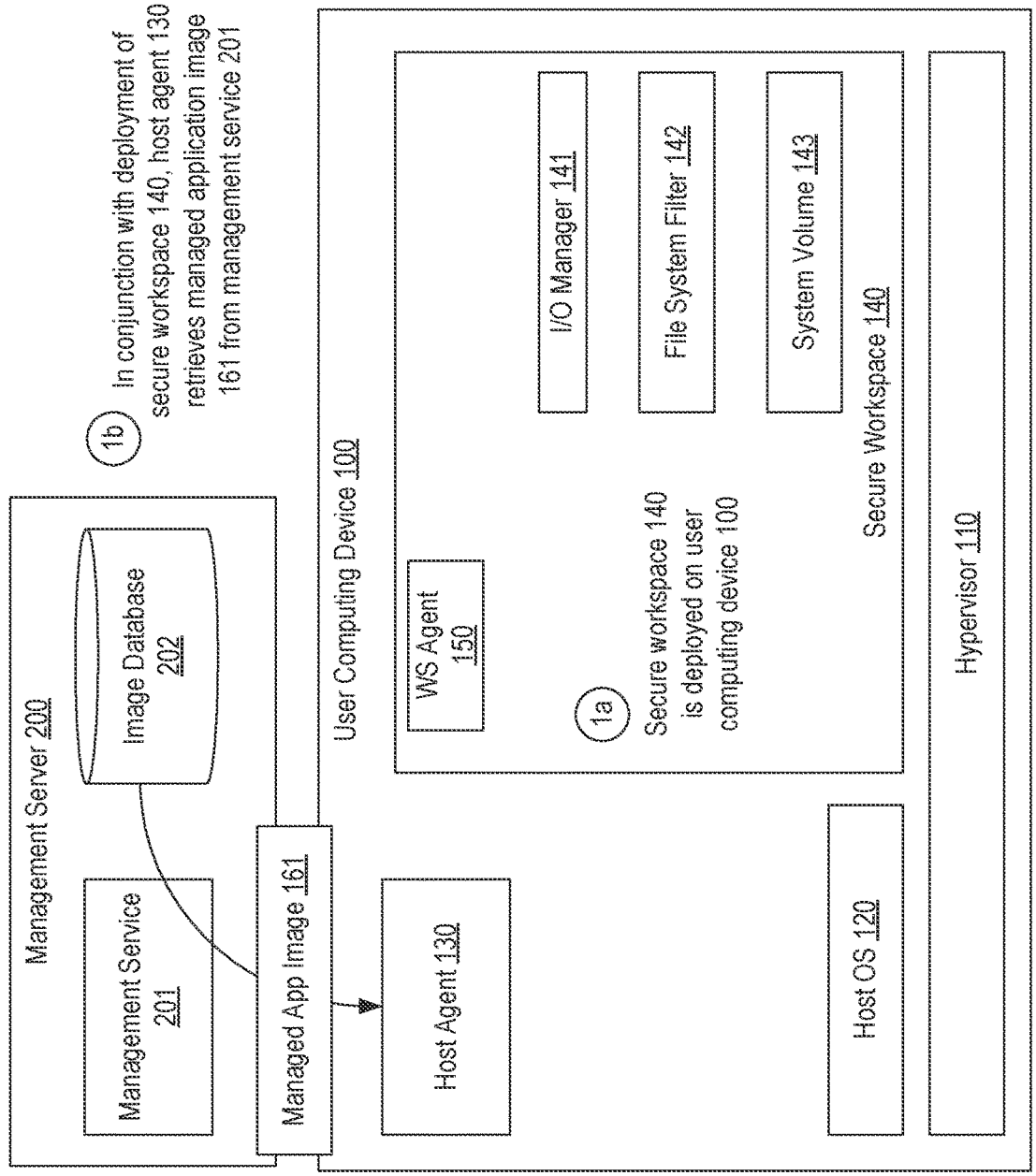
FIGS. 2A-2G provide an example of how persistence may be enabled in a volatile secure workspace in accordance with embodiments of the present invention.

FIGS. 2A-2G provide an example of how persistence can be enabled in a volatile secure workspace in accordance with embodiments of the present invention. Turning to FIG. 2A, in step 1a, it is assumed that secure workspace 140 is deployed on user computing device 100 such as in response to a user logging in to user computing device 100. In step 1b, and in conjunction with the deployment of secure workspace 140, host agent 130 can retrieve managed application image 161 from management service 201. For example, host agent 130 could submit a request to management server 200 that identifies user computing device 100, the user that is logged into user computing device 100 and/or secure workspace 140, and management service 201 could query image database 202 for any images that should be provided to host agent 130 such as an image containing any application that is assigned to the user, user computing device 100, secure workspace 140, another secure workspace, etc. In this example, it is assumed that an administrator has assigned managed application image 161 (or managed application 163) to the user of user computing device 100. Host agent 130 could be configured to obtain managed application image 161 at any reasonable time including prior to secure workspace 140 being deployed. In any case, secure workspace 140 as initially deployed does not include managed application 163 given that it is a volatile secure workspace.

Figure 2B:
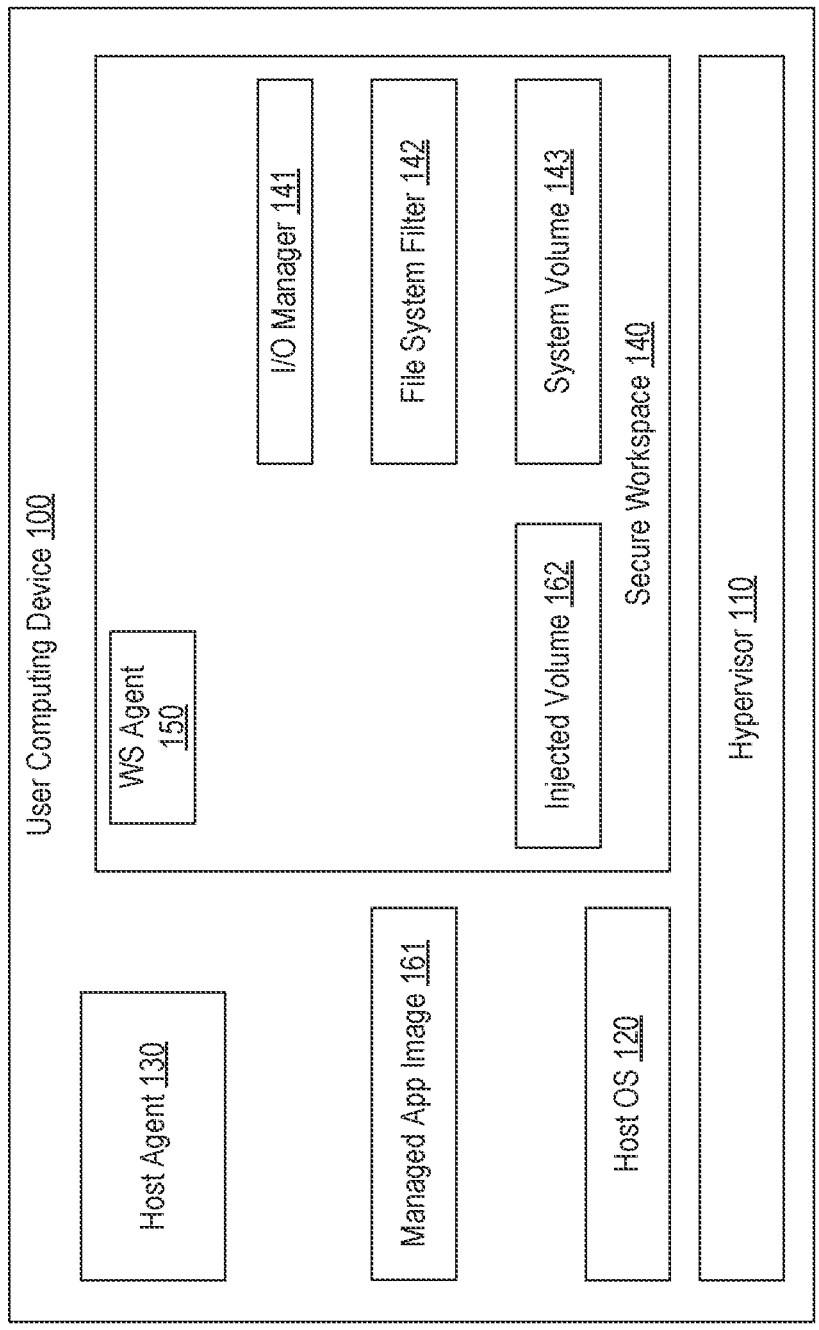

Turning to FIG. 2B, in step 2, host agent 130 mounts managed application image 161 to secure workspace 140 thereby creating injected volume 162 within secure workspace 140. At this point, the contents of managed application image 161 will be accessible within secure workspace 140.

Figure 2C:
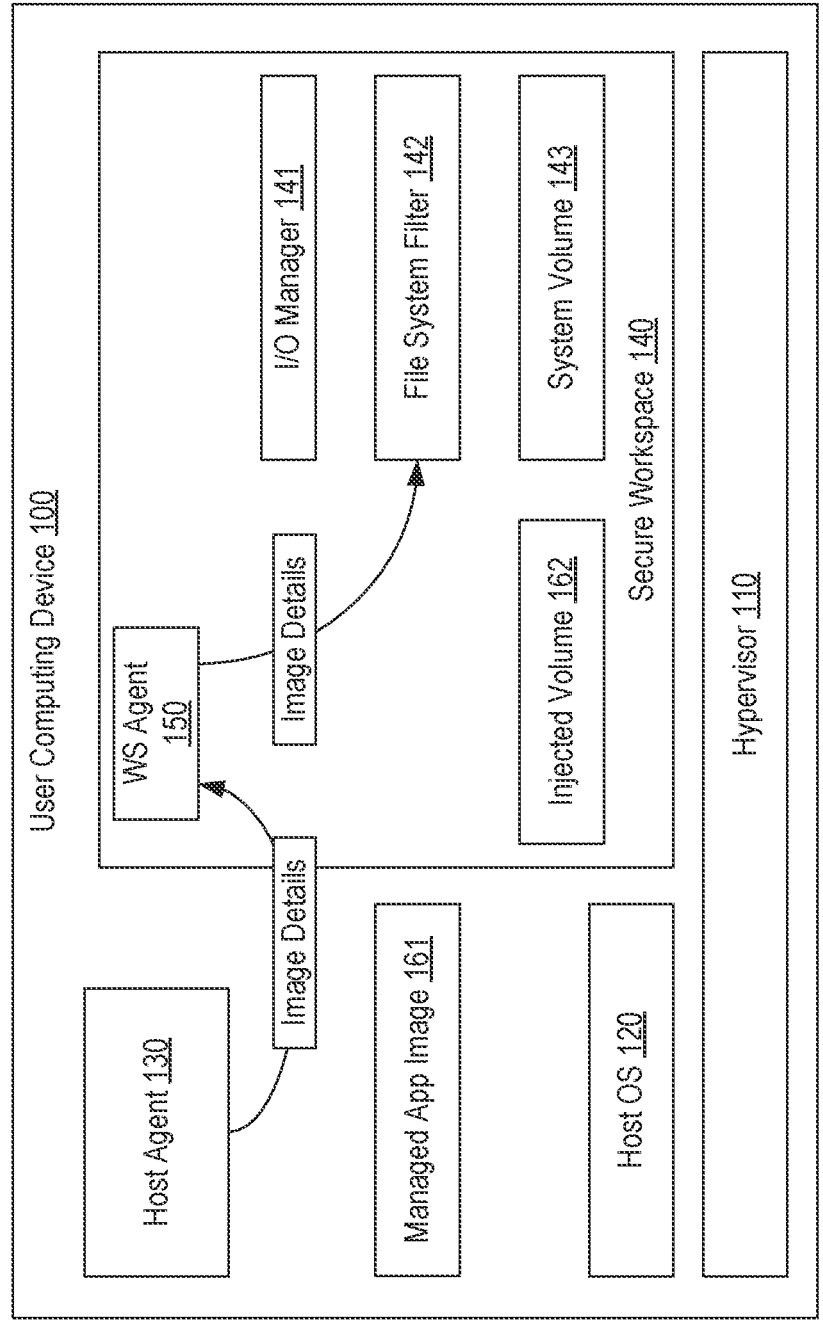

Turning to FIG. 2C, in step 3 and in conjunction with mounting managed application image 161 to secure workspace 140, host agent 130 can send image details of managed application image 161 to workspace agent 150 which in turn can provide the image details to file system filter 142. As described in detail below, these image details can identify which application(s), files, configurations, etc. are contained in managed application image 161 including where or how these contents are stored in managed application image.

Figure 2D:
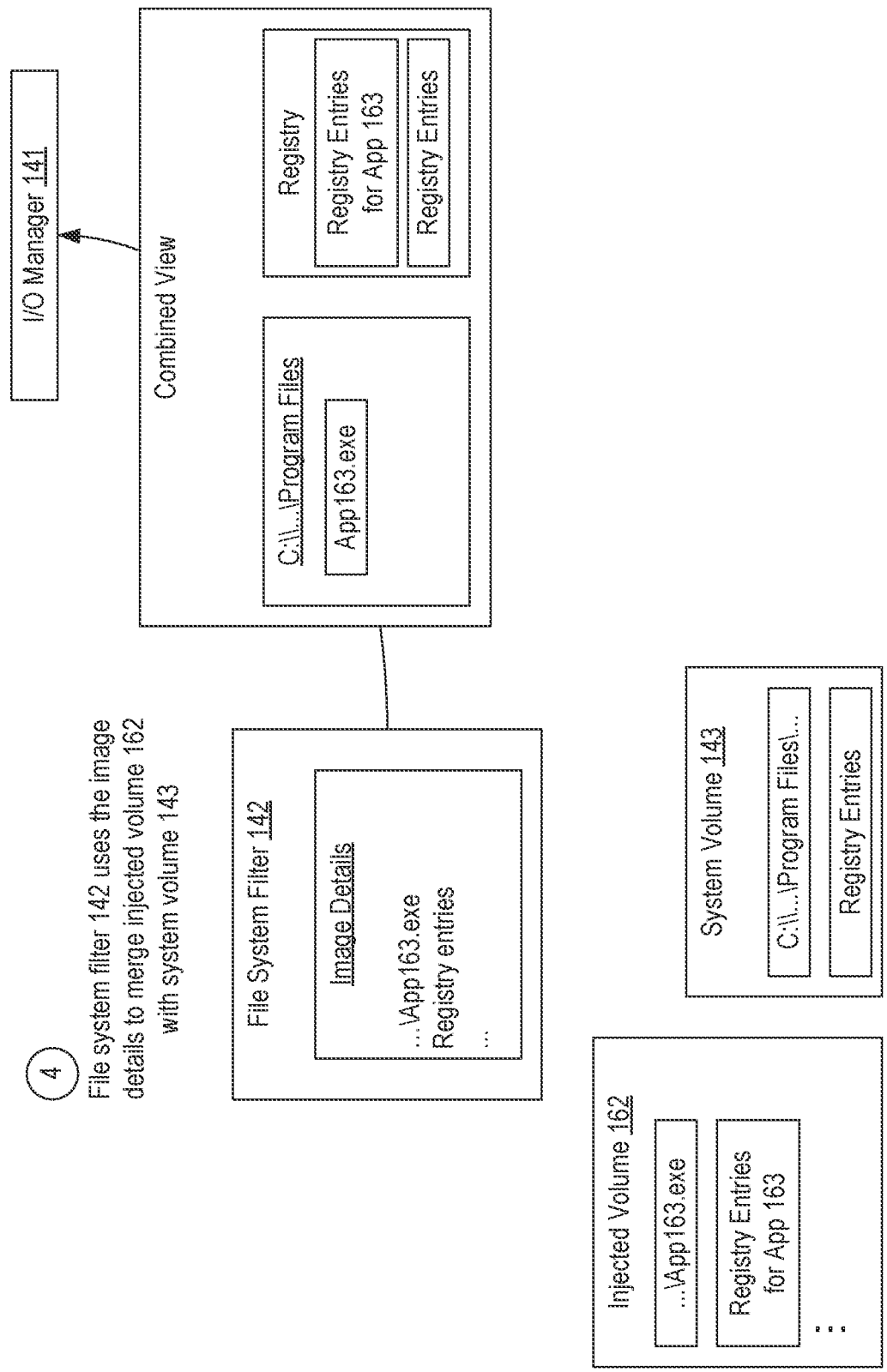

Turning to FIG. 2D, in step 4, file system filter 142 can use the image details to merge injected volume 162 with system volume 143 (e.g., to cause the contents of injected volume 162/managed application image 161 to appear as if they were part of system volume 143). As shown, the image details could identify an executable for managed application 163 including the path at which it is stored in injected volume 162, registry entries for managed application 163 (e.g., registry hives), and possibly other files or configurations for managed application 163 that are contained in managed application image 161 and accessible via injected volume 162. File system filter 142 can provide a combined view to I/O manager 141 in which these contents of injected volume 162 appear to be part of system volume 143. For example, the executable for managed application 163 (App163.exe) is represented as being available in the Program Files folder on system volume 143 (the C: volume), and the registry entries for managed application 163 are represented as being part of the registry associated with system volume 143.

Figure 2E:
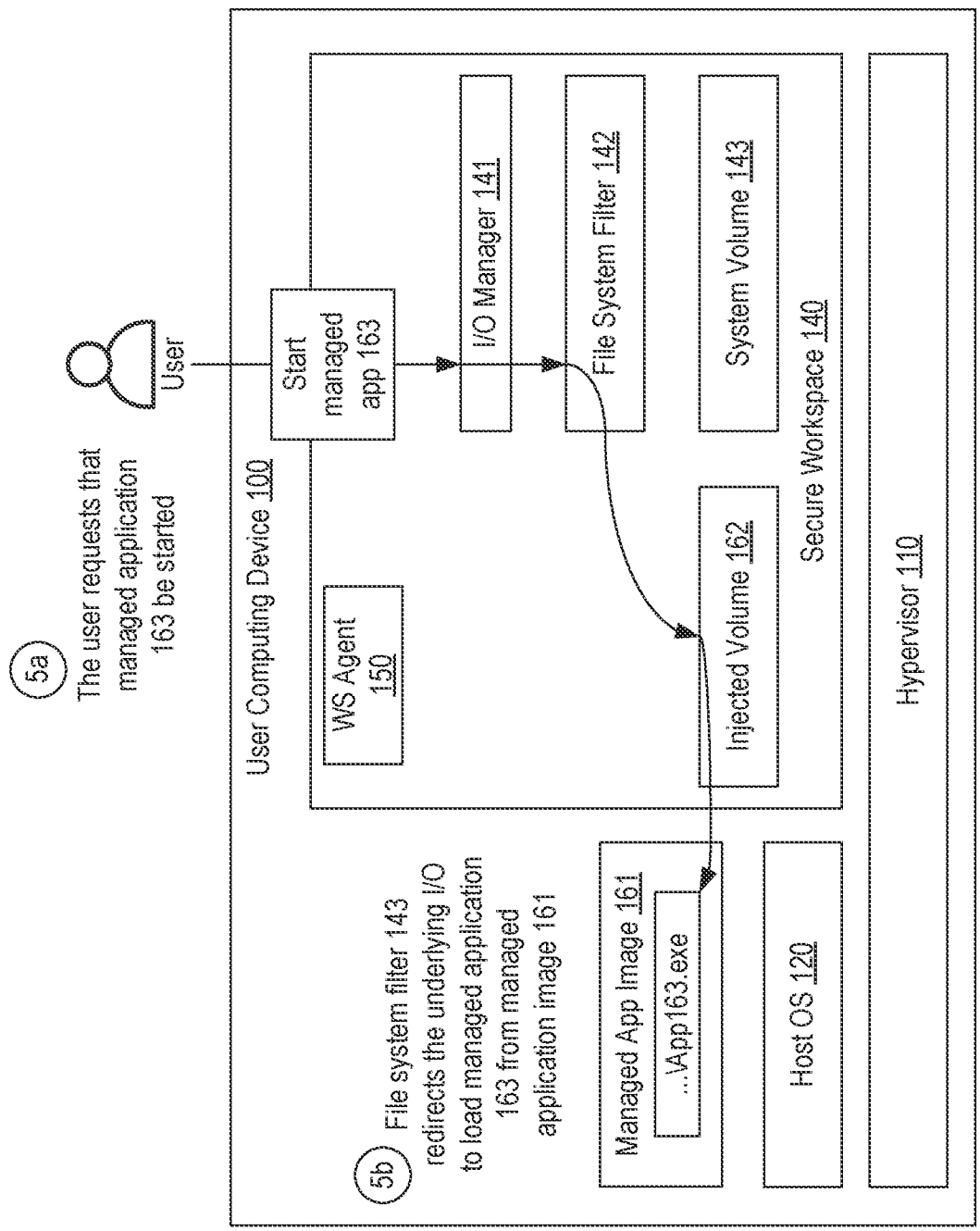

Turning to FIG. 2E, in step 5a, it is assumed that the user has requested that managed application 163 be started. For example, the user could select an icon for App163.exe that is represented as being available in the Program Files folder on the C: volume. In response to this request, I/O manager 141 would generate I/O attempting to load the executable for managed application 163 stored in the Program Files folder when in fact it is accessible on injected volume 162. In step 5b, file system filter 143 can redirect such I/O to cause managed application 163 to be loaded from managed application image 161. For example, file system filter 142 may use the image details for managed application image 161 to detect that the target of the I/O (e.g., C: \\ . . . \Program Files \App163.exe) pertains to content stored in managed application image 161 and can reparse the I/O to direct it to injected volume 162 (e.g., to D: \\SomeFolder\App163.exe). Accordingly, the image details can include sufficient information to allow file system filter 142 to reparse I/O pertaining to managed application 163 and its associated files, configurations, registry entries, etc. to injected volume 162. As a result of step 5b, managed application 163 can be immediately loaded in secure workspace 140 from managed application image 161 as opposed to installing managed application 163 within secure workspace 140.

Figure 2F:
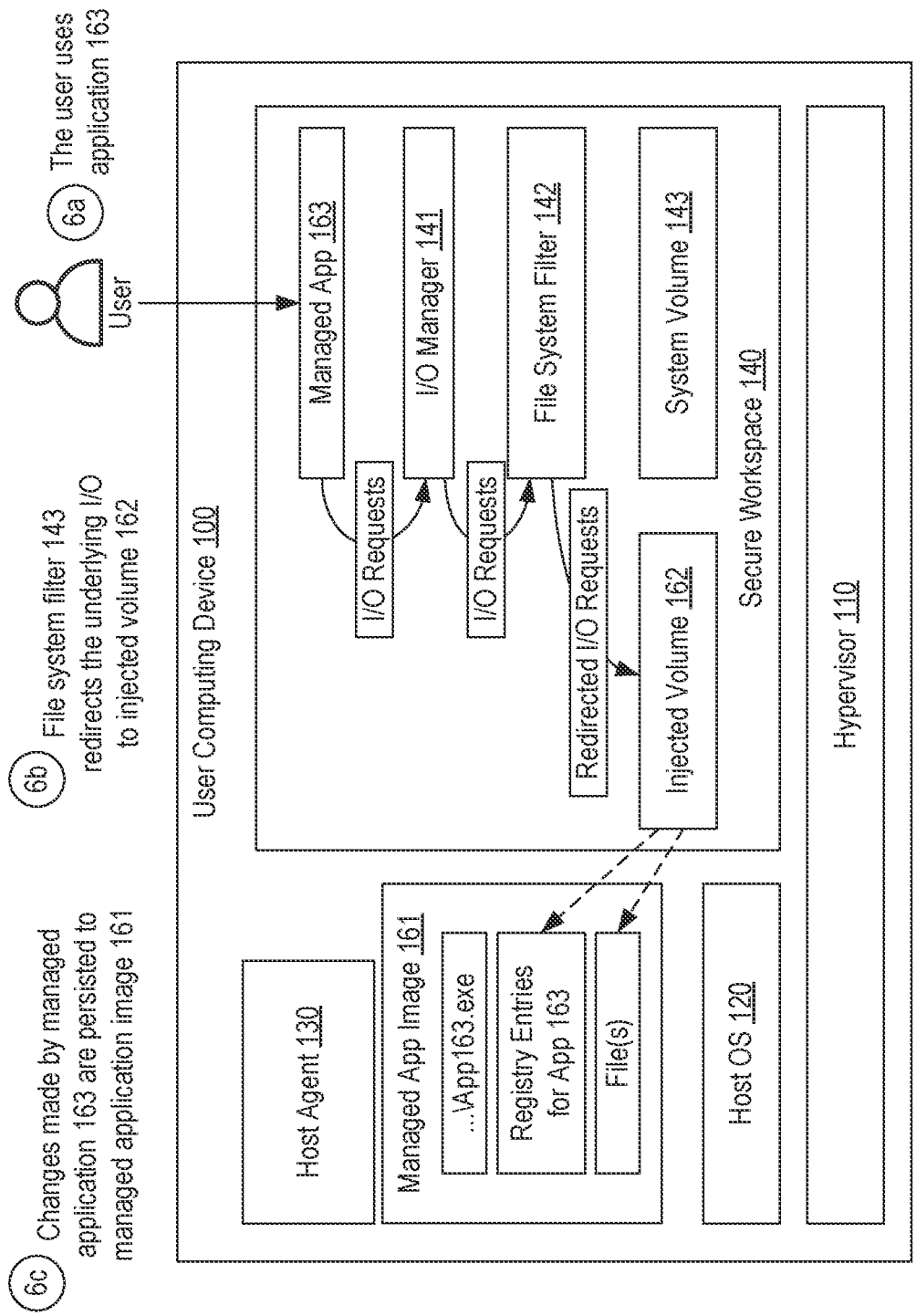

Turning to FIG. 2F, it is now assumed that managed application 163 is loaded in secure workspace 140. In step 6a, the user can use application 163. For example, the user could create files in managed application 163, customize managed application 163, or otherwise interact with managed application 163 in a manner that causes I/O to be performed. The I/O requests that are generated as the user uses managed application 163 are directed down to file system filter 142. Notably, due to the merging of injected volume 162 and system volume 143, the contents of injected volume 162, and therefore these I/O requests, may target system volume 143. For example, an I/O request for creating a new file may target a folder on the system volume 143 or an I/O request for updating the registry entries for managed application 163 may target the registry associated with system volume 143. In step 6b, file system filter 143 can redirect these I/O requests that originate or are otherwise associated with managed application 163 to injected volume 162. For example, if managed application 163 attempts to create a new file at C:\\user\myfiles\, file system filter 142 can reparse the request to injected volume 162. Similarly, if managed application 163 creates a new registry entry or updates an existing registry entry, file system filter 142 can reparse the corresponding I/O requests to injected volume 162 so that such entries are created/updated on managed application image 161. As a result, in step 6c, changes made by managed application 163 within secure workspace 140 will be persisted to managed application image 161 as opposed to being made on system volume 143 which will be discarded when secure workspace 140 is closed.

In comparison to what is shown in FIG. 2F, if file system filter 142 receives an I/O request that is not associated with managed application 163, it can simply pass the request down the I/O stack to system volume 143 as opposed to reparsing it. Accordingly, file system filter 142 can be configured to determine whether each particular I/O request (including registry requests) targets an artifact that is actually stored on managed application image 161 rather than system volume 143. Such determinations can be made using the image details initially shared by host agent 130 and/or image details (or mappings) created by file system filter 142 as it reparses I/O requests to injected volume 162 (e.g., mapping a file path on system volume 143 where a file appears to be stored to a file path on injected volume 162 where the file is actually stored).

Figure 2G:
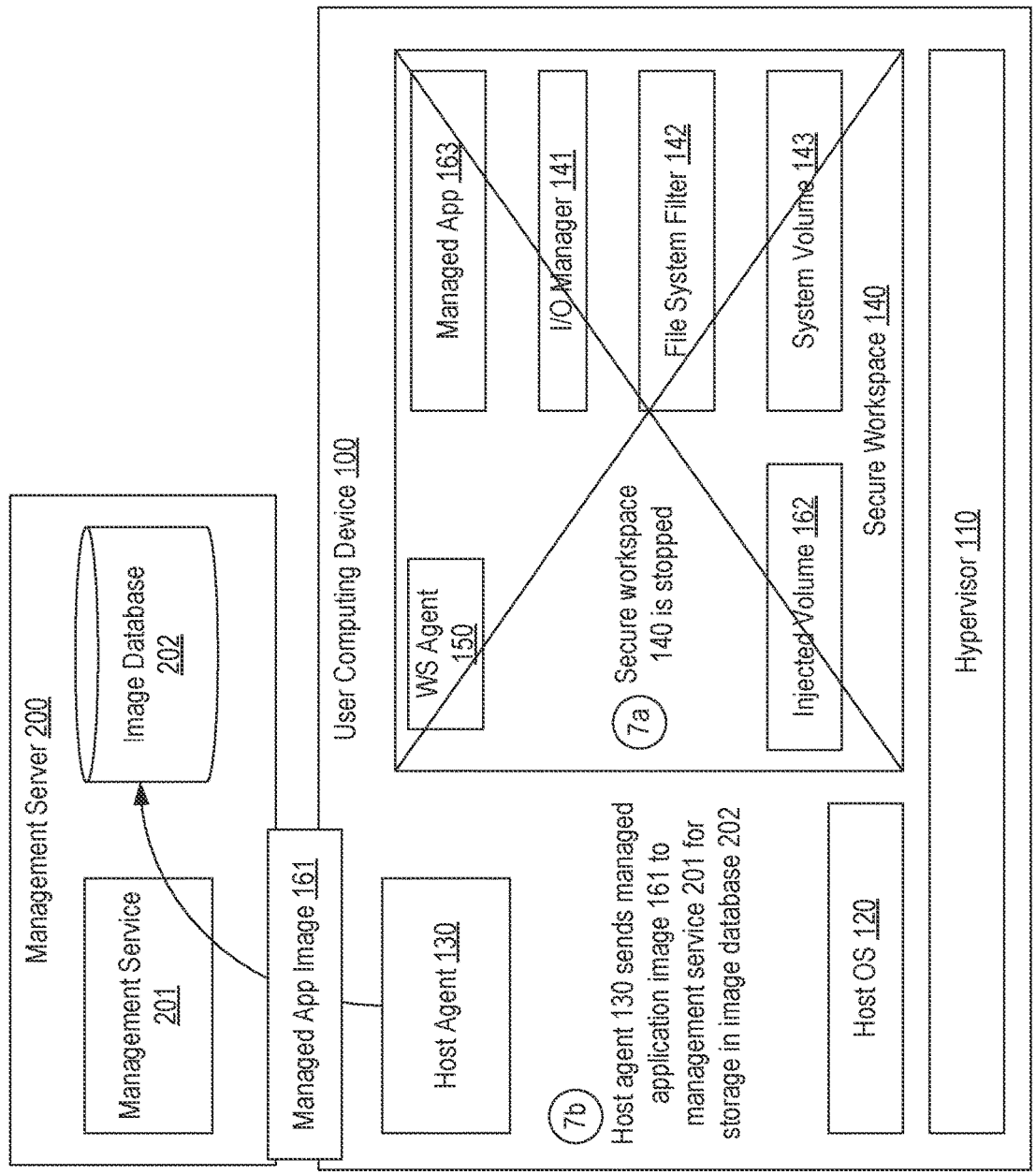

Turning to FIG. 2G, in step 7a, it is assumed that secure workspace 140 is stopped. For example, the user could close secure workspace 140 or initiate a log off or shutdown of user computing device 100. In conjunction with secure workspace 140 being stopped, host agent 130 can send managed application image 161, which would include any changes made during the execution of managed application 163 within secure workspace 140, to management service 201 for storage in image database 202. Notably, when secure workspace 140 is stopped, any changes made to system volume 143 will be discarded.

The next time the user logs in to user computing device 100 (or otherwise starts secure workspace 140), host agent 130 can repeat the steps represented in FIGS. 2A-2D to cause managed application 163 to again be immediately available within secure workspace 140 along with any files, customizations or other changes the user may have made. In this way, managed application 163 and its corresponding data can be persisted even though managed application 163 is made available to the user within a volatile secure workspace.

In the above example, only one application is made available within secure workspace. However, in some embodiments, more than one application may be made available in a volatile secure workspace. In such cases, a single image could contain each of the applications and corresponding data, or a separate image could be used for each application (which would result in multiple injected volumes being created). In either case, the image details for the image(s) could be provided to file system filter 142 for creating a combined view and for reparsing I/O to the image(s).

As suggested above, host agent 130 could retrieve images from management service 201 at different times. In some embodiments, host agent 130 could query management service 201 for all images applicable to a logged in user as part of startup of user computing device 100. In other embodiments, host agent 130 could query management service 201 for any image applicable to a particular secure workspace when the secure workspace is started. In either case, host agent 130 can mount the respective image(s) to each secure workspace once the secure workspace is started.

In summary, embodiments of the present invention can enable persistence in a volatile secure workspace. As a result, the security benefits of volatile secure workspaces can be obtained without sacrificing the user experience or productivity.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for enabling persistence in a volatile secure workspace, the method comprising:
   obtaining, by a host agent executing on a user computing device, a managed application image that is associated with a volatile secure workspace, the managed application image including a managed application;
   in response to the volatile secure workspace being deployed on the user computing device, mounting, by the host agent which executes on the user computing device outside of the volatile secure workspace, the managed application image to the volatile secure workspace to create an injected volume within the volatile secure workspace;
   sharing, by the host agent, image details for the managed application image with a file system filter running in the volatile secure workspace;
   using, by the file system filter, the image details to cause the managed application to be loaded in the volatile secure workspace from the managed application image;
   receiving, by the file system filter, I/O requests associated with the managed application;
   using, by the file system filter, the image details to redirect the I/O requests associated with the managed application to the managed application image to thereby create or update one or more artifacts on the managed application image that is stored outside the volatile secure workspace; and
   persisting the managed application image with the one or more artifacts when the volatile secure workspace is stopped.

2. The method of claim 1, further comprising:
   in response to the volatile secure workspace being subsequently deployed on the user computing device, mounting the managed application image with the one or more artifacts to the volatile secure workspace.

3. The method of claim 1, wherein the managed application image is obtained in response to a user logging into the user computing device.

4. The method of claim 1, wherein the managed application image is obtained in response to the volatile secure workspace being deployed.

5. The method of claim 1, wherein the file system filter creates a merged view of the injected volume and a system volume of the volatile secure workspace.

6. The method of claim 1, wherein redirected the I/O requests comprises reparsing the I/O requests.

7. The method of claim 1, further comprising:
   passing, by the file system filter, I/O requests that are not associated with the managed application to a system volume.

8. The method of claim 1, wherein the one or more artifacts include one or more files.

9. The method of claim 1, wherein the one or more artifacts include one or more registry entries.

10. One of more computer storage media storing computer executable instructions which when executed implement a method for enabling persistence in a volatile secure workspace, the method comprising:
    obtaining, by a host agent executing on a user computing device, a managed application image that is associated with a volatile secure workspace, the managed application image including a managed application;
    in response to the volatile secure workspace being deployed on the user computing device, mounting, by the host agent which executes on the user computing device outside of the volatile secure workspace, the managed application image to the volatile secure workspace to create an injected volume within the volatile secure workspace;
    sharing, by the host agent, image details for the managed application image with a file system filter running in the volatile secure workspace;
    using, by the file system filter, the image details to cause the managed application to be loaded in the volatile secure workspace from the managed application image;
    receiving, by the file system filter, I/O requests associated with the managed application;
    using, by the file system filter, the image details to redirect the I/O requests associated with the managed application to the managed application image to thereby create or update one or more artifacts on the managed application image that is stored outside the volatile secure workspace; and
    persisting the managed application image with the one or more artifacts when the volatile secure workspace is stopped.

11. The computer storage media of claim 10, wherein the managed application image is obtained in response to a user logging into the user computing device.

12. The computer storage media of claim 10, wherein the image details define a path to an executable of the managed application.

13. The computer storage media of claim 10, wherein persisting the managed application image with the one or more artifacts comprises sending the managed application image with the one or more artifacts to a management server for storage.

14. The computer storage media of claim 13, wherein the method further comprises:
> subsequently obtaining the managed application image with the one or more artifacts from the management server; and
>
> in response to the volatile secure workspace being subsequently deployed on the user computing device, mounting the managed application image with the one or more artifacts to the volatile secure workspace to create the injected volume within the volatile secure workspace.

15. A system comprising:
> a management server having a management service; and
>
> at least one user computing device that includes one or more processors and computer storage media storing computer executable instructions which when executed by the one or more processors implement a method for enabling persistence in a volatile secure workspace, the method comprising:
>> obtaining, by a host agent executing on the user computing device and from the management server, a managed application image that is associated with a volatile secure workspace, the managed application image including a managed application;
>>
>> in response to the volatile secure workspace being deployed on the user computing device, mounting, by the host agent which executes on the user computing device outside of the volatile secure workspace, the managed application image to the volatile secure workspace to create an injected volume within the volatile secure workspace;
>>
>> sharing, by the host agent, image details for the managed application image with a file system filter running in the volatile secure workspace;
>>
>> using, by the file system filter, the image details to cause the managed application to be loaded in the volatile secure workspace from the managed application image;
>>
>> receiving, by the file system filter, I/O requests associated with the managed application;
>>
>> using, by the file system filter, the image details to redirect the I/O requests associated with the managed application to the managed application image to thereby create or update one or more artifacts on the managed application image that is stored outside the volatile secure workspace; and
>>
>> persisting, on the management server, the managed application image with the one or more artifacts when the volatile secure workspace is stopped.

16. The system of claim 15, wherein the method further comprises:
> in response to the volatile secure workspace being subsequently deployed on the user computing device, mounting the managed application image with the one or more artifacts to the volatile secure workspace.

17. The system of claim 15, wherein the file system filter creates a merged view of the injected volume and a system volume of the volatile secure workspace.

* * * * *